(12) United States Patent
Ozaki et al.

(10) Patent No.: US 9,347,350 B2
(45) Date of Patent: May 24, 2016

(54) ENGINE UNIT

(71) Applicant: KOMATSU LTD., Tokyo (JP)

(72) Inventors: Taira Ozaki, Ikoma (JP); Hiroshi Nakagami, Hirakata (JP); Hironori Yamamitsu, Hirakata (JP); Kanji Namimatsu, Oyama (JP); Hiroshi Ohta, Sano (JP); Kenji Matsubara, Oyama (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/112,395

(22) PCT Filed: Mar. 29, 2013

(86) PCT No.: PCT/JP2013/059619
§ 371 (c)(1),
(2) Date: Oct. 17, 2013

(87) PCT Pub. No.: WO2014/155703
PCT Pub. Date: Oct. 2, 2014

(65) Prior Publication Data
US 2014/0290220 A1    Oct. 2, 2014

(51) Int. Cl.
| | |
|---|---|
| *F01N 1/00* | (2006.01) |
| *F01N 3/08* | (2006.01) |
| *F01N 3/10* | (2006.01) |
| *F01N 13/18* | (2010.01) |
| *F01N 3/021* | (2006.01) |
| *F01N 13/00* | (2010.01) |

(52) U.S. Cl.
CPC *F01N 3/08* (2013.01); *F01N 3/021* (2013.01); *F01N 3/10* (2013.01); *F01N 13/009* (2014.06); *F01N 13/1816* (2013.01); *F01N 13/1822* (2013.01); *F01N 2470/12* (2013.01); *F01N 2590/08* (2013.01); *Y02T 10/20* (2013.01)

(58) Field of Classification Search
USPC .................. 60/272, 297, 299, 311, 322, 323; 180/296, 309, 89.1, 89.2
See application file for complete search history.

(56) References Cited

U.S. PATENT DOCUMENTS 4,345,430 A * 8/1982 Pallo et al. ............... 60/282
5,988,308 A * 11/1999 Qutub ..................... 180/309

(Continued)

FOREIGN PATENT DOCUMENTS

| JP | 51-151824 U | 12/1976 |
|---|---|---|
| JP | 2007-285141 A | 11/2007 |

(Continued)

OTHER PUBLICATIONS

The Japanese Office Action for the corresponding Japanese application No. 2013-533031, issued on Dec. 17, 2013.

(Continued)

*Primary Examiner* — Binh Q Tran
(74) *Attorney, Agent, or Firm* — Global IP Counselors, LLP

(57) ABSTRACT

An engine unit includes an engine, an exhaust gas treatment device and a connecting pipe. The engine has an exhaust gas port. The exhaust gas treatment device is arranged above the engine. The connecting pipe connects the exhaust gas port and the exhaust gas treatment device. The connecting pipe has an expandable-contractible bellows portion. The bellows portion has a linear form following the upward-downward direction. The lower end portion of the bellows portion is positioned lower than at least a part of the exhaust gas port.

11 Claims, 10 Drawing Sheets

(56) References Cited

U.S. PATENT DOCUMENTS

| | | | |
|---|---|---|---|
| 6,173,800 B1* | 1/2001 | Steenackers et al. | 180/89.2 |
| 8,256,551 B2* | 9/2012 | Entriken et al. | 180/68.1 |
| 8,418,448 B2* | 4/2013 | Kamata et al. | 60/322 |
| 8,505,661 B2* | 8/2013 | Tsuji | E02F 3/7609 180/68.4 |
| 8,556,014 B2* | 10/2013 | Smith | B60K 11/04 123/41.49 |
| 8,631,895 B2* | 1/2014 | Tanaka et al. | 180/309 |
| 8,695,748 B2* | 4/2014 | Togo et al. | 180/309 |
| 8,851,224 B2* | 10/2014 | Hayashi et al. | 180/309 |
| 9,163,380 B2* | 10/2015 | Homma | E02F 9/0833 |
| 2010/0186381 A1 | 7/2010 | Charles et al. | |

FOREIGN PATENT DOCUMENTS

| | | |
|---|---|---|
| JP | 2007-331602 A | 12/2007 |
| JP | 2010-71176 A | 4/2010 |
| JP | 2012-2016 A | 1/2012 |
| JP | 2012-171596 A | 9/2012 |
| JP | 2012-215022 A | 11/2012 |

OTHER PUBLICATIONS

International Search Report for PCT/JP2013/059619, issued on May 7, 2013.

* cited by examiner

ENGINE UNIT

CROSS-REFERENCE TO RELATED APPLICATIONS

This application is a U.S. National stage application of International Application No. PCT/JP2013/059619, filed on Mar. 29, 2013.

BACKGROUND

1. Field of the Invention

The present invention relates to an engine unit.

2. Background Information

In recent years, due to environmental protection considerations, engine units are being mounted with intensive exhaust gas treatment devices. An exhaust gas treatment device is a device that purifies exhaust gas from an engine. For example, an exhaust gas treatment device may be a device that lowers nitrogen oxide (NOx) or a device that lowers carbon monoxide (CO), or it may be a device that removes particulate matter. In the engine apparatus disclosed in Japan Patent Laid-open Patent Publication No. 2010-71176 for example, an exhaust gas treatment device is arranged above the engine. The exhaust gas treatment device is connected to the engine via a connecting pipe.

SUMMARY

When the exhaust gas treatment device is arranged above the engine, the vibrational amplitude on the exhaust gas treatment device increases due to the vibrations of the engine. For this reason, the connecting pipe connecting the engine and the exhaust gas treatment device sustains a considerable load due to these vibrations.

An object of the present invention is to provide an engine unit in which the load on the connecting pipe due to vibrational amplitude can be reduced.

The engine unit according to a first aspect of the invention herein disclosed, provides an engine, an exhaust gas treatment device, and a connecting pipe. The engine has an exhaust gas port. The exhaust gas treatment device is arranged above the engine. The connecting pipe connects the exhaust gas port and the exhaust gas treatment device. The connecting pipe has an expandable-contractible bellows portion. The bellows portion has a linear form following the upward-downward direction. The lower end portion of the bellows portion is positioned lower than at least a part of the exhaust gas port.

In this engine unit, the connecting pipe has an expandable-contractible bellows portion. Accordingly, vibrations conveyed to the connecting pipe are absorbed by the bellows portion. For this reason the load on the connecting pipe due to vibrations is reduced. Further, the bellows portion has a linear form following the upward-downward direction. Accordingly, the bellows portion can be compactly arranged. Further, the lower end portion of the bellows portion is positioned below at least a part of the exhaust gas port. For this reason, the length of the bellows portion can be increased. Thus, vibration absorption capability in the bellows portion can be increased.

It is suitable for the upper end portion of the bellows portion to be arranged above the lower end portion of the exhaust gas treatment device. In this arrangement, the length of the bellows portion can be increased.

It is suitable for the length of the bellows portion to be longer than the distance in the upward-downward direction between the lower end portion of the exhaust gas treatment device and the upper end portion of the exhaust gas port. In this arrangement, the length of the bellows portion can be increased, enabling the vibration absorption capability in the bellows portion to be improved.

It is suitable for the connecting pipe to have a first connecting pipe portion. The first connecting pipe portion connects the exhaust gas port and the lower end portion of the bellows portion. It is suitable for the first connecting pipe portion to be of a form bending from the exhaust gas port toward a downward position lower than the exhaust gas port. In this arrangement, the length of the bellows portion can be increased, enabling the vibration absorption capability of the bellows portion to be improved.

It is suitable for the engine unit to further provide a bracket. The exhaust gas treatment device is arranged on the bracket. The first connecting pipe portion has a supporting part supporting the bracket. In this arrangement, as the exhaust gas treatment device and the region proximate to the exhaust gas port of the engine are of the same vibration system, the vibrational load on the connecting pipe can be reduced.

It is suitable for the exhaust gas treatment device to have a cylindrical portion and an end face. The end face closes the end of the cylindrical portion in the axial direction of the exhaust gas treatment device. It is suitable for the connecting pipe to connect to the end face of the exhaust gas treatment device. In this arrangement, the length of the connecting pipe can be increased. For this reason, the length of the bellows portion can be increased, enabling the vibration absorption capability of the bellows portion to be improved.

It is suitable for the connecting pipe to have a second connecting pipe portion. The second connecting pipe portion connects the end face of the exhaust gas treatment device and the upper end portion of the bellows portion. It is suitable for the second connecting pipe portion to be directly mounted on the end face of the exhaust gas treatment device. In this arrangement, in comparison to the case in which the second connecting pipe portion connects to the connecting port protruding outward from the end face of the exhaust gas treatment device, a connecting portion of the second connecting pipe portion and the exhaust gas treatment device can be smaller.

It is suitable for the bellows portion to have a first bellows tube and a second bellows tube. The second bellows tube is a separate body to the first bellows tube. The second bellows tube is connected to the first bellows tube. In this arrangement, the occurrence of resonance in the bellows portion can be suppressed.

It is suitable for the engine to have a crankshaft. It is suitable for the exhaust gas treatment device to be arranged such that the axial line thereof follows the axial direction of the crankshaft. In this arrangement, the exhaust gas treatment device can be efficiently arranged in space above the engine.

A working vehicle according to another aspect of the invention herein disclosed provides the engine unit described above. In this arrangement, in this working vehicle, the load on a connecting pipe due to vibration can be reduced.

It is suitable for the working vehicle to further provide an engine room and a cab. The engine room houses the engine unit. The cab is arranged adjacent to the engine room. The engine room has a wall part. The wall part is arranged between the cab and the engine. It is suitable for the bellows portion to be arranged so as to extend in the upward-downward direction following the wall part.

In this arrangement, the exhaust gas treatment device and the bellows portion can be arranged proximate to the wall part. That is to say, the exhaust gas treatment device and the bellows portion can be arranged as far as possible to the rear. For this reason, in the engine room, substantial space can be maintained for arranging other equipment forward of the exhaust gas treatment device.

The engine unit related to the invention herein disclosed, enables the load on a connecting pipe due to vibration can be reduced.

DETAILED DESCRIPTION OF EMBODIMENT(S)

Figure 1:
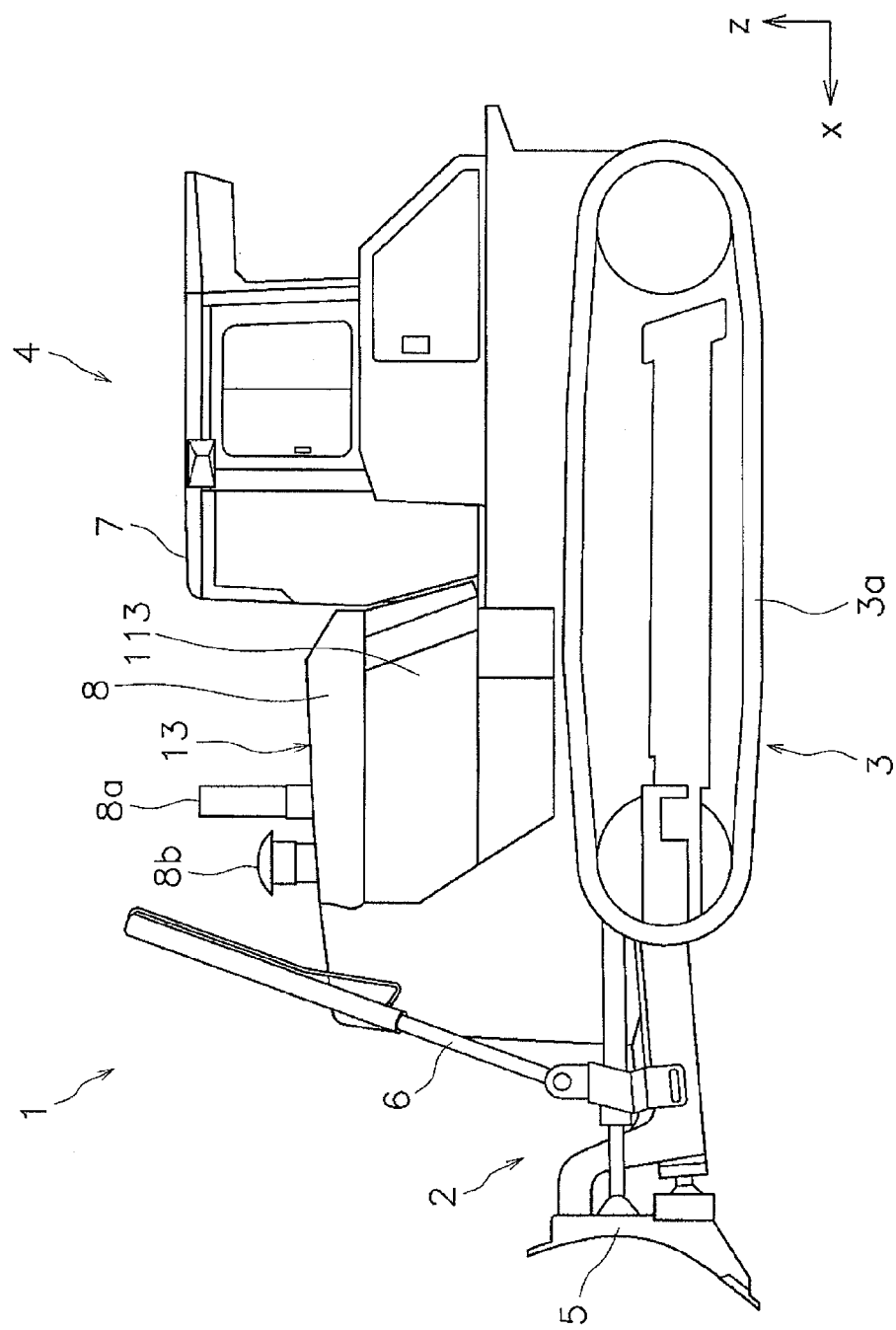
FIG. 1 is a left side view of a working vehicle related to an embodiment.

A working vehicle related to an embodiment of the present invention will now be described with reference to the drawings. FIG. 1 is a left side view of a working vehicle 1 related to a present embodiment. The working vehicle 1 is a bulldozer. The working vehicle 1 provides a working implement 2, a traveling device 3, and a vehicle body 4. The traveling device 3 is a device that causes the vehicle to travel, and has a crawler track 3a. As the crawler track 3a is driven, the bulldozer 1 travels.

The vehicle body 4 includes a cab 7 and an engine room 8. The cab 7 is arranged adjacent to the engine room 8. The engine room 8 is arranged forward of the cab 7. In this embodiment, forward and rear, left and right refer to how each of these is seen from the point of view of an operator in the cab 7. In the drawings, the forward and rearward directions are indicated on the x axis, the left and right directions are indicated on the y axis, and the upward and downward directions are indicated on the z axis.

The working implement 2 is provided forward of the engine room 8. The working implement 2 has a blade 5 and a hydraulic cylinder 6. The blade 5 is provided such that it is able to move in the upward-downward direction. The hydraulic cylinder 6 changes the posture of the blade 5.

Figure 2:
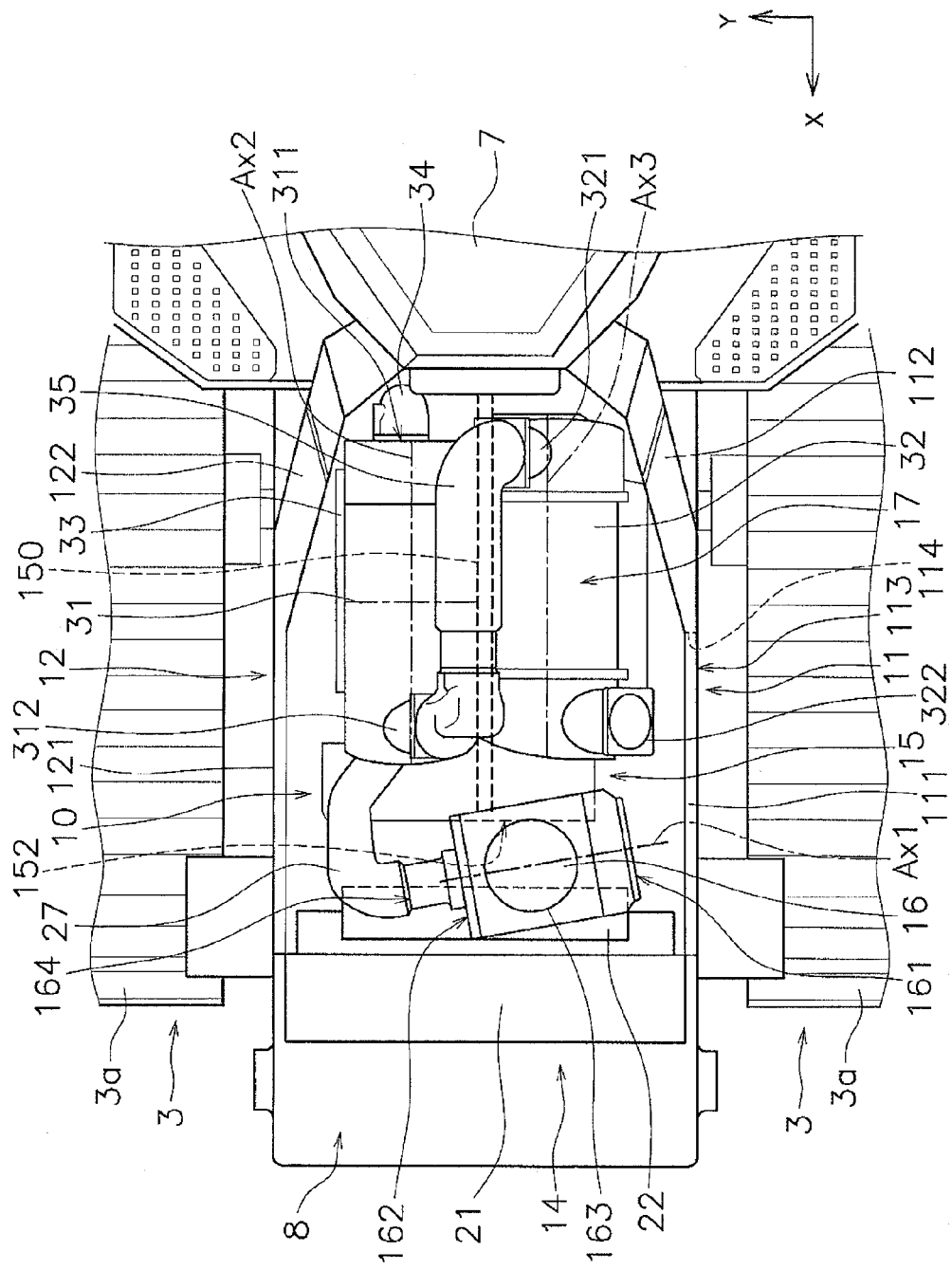
FIG. 2 is a plan view showing the configuration within the engine room of the working vehicle.
Figure 3:
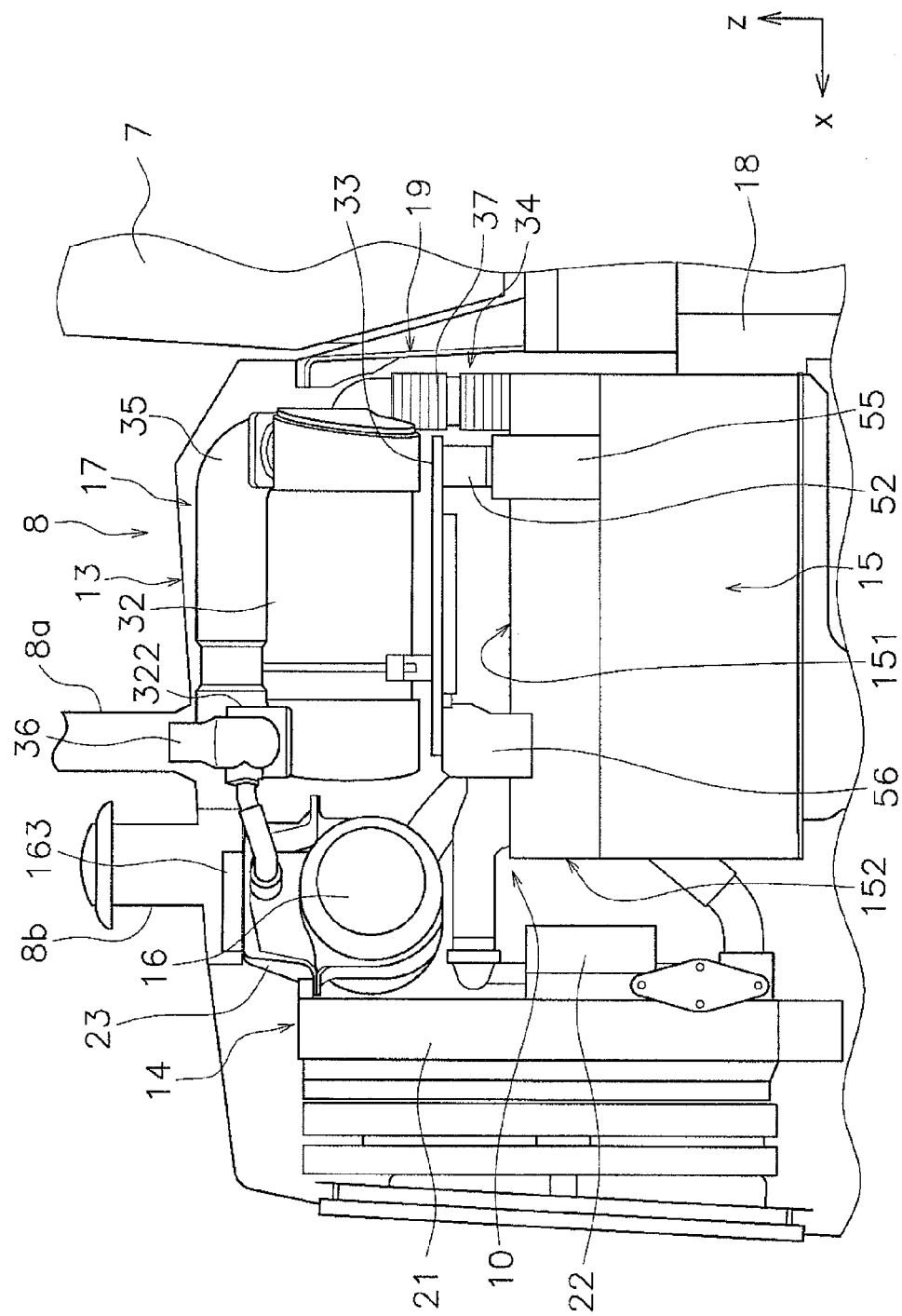
FIG. 3 is a left side view showing the configuration within the engine room.

FIG. 2 is a plan view showing the configuration within the engine room 8. FIG. 3 is a left side view showing the configuration within the engine room 8. Note that to facilitate ease of understanding, in FIG. 2 and FIG. 3 part of the configuration within the engine room 8 is omitted.

As shown in FIG. 2, the engine room 8 has a first side face 11 and a second side face 12. In this embodiment, the first side face 11 is the left side face of the engine room 8. The second side face 12 is the right side face of the engine room 8. The first side face 11 has a first planar section 111 and a first inclined face 112. In the planar view of the vehicle, the planar section 111 is disposed extending in the forward-backward direction. The first inclined face 112 is arranged rearward of the planar section 111.

The second side face 12 has a second planar section 121 and a second inclined face 122. In the planar view of the vehicle, the second planar section 121 is arranged extending in the forward-backward direction. The second inclined face 122 is arranged rearward of the second planar section 121. In the planar view of the vehicle, the first inclined section 112 and the second inclined face 122 are arranged at an inclination such that the gap between them decreases in the rearward direction.

As shown in FIG. 3, the engine room 8 has an upper face 13. The upper face 13 of the engine room 8 inclines downward in the forward direction. An exhaust gas outlet 8a described subsequently, juts out upward from the upper face 13 of the engine room 8. Further, a head portion 8b described subsequently, juts out upward from the upper face 13 of the engine room 8.

As shown in FIG. 2 and FIG. 3, the working implement 1 has an engine unit 10, a cooling unit 14, and an air cleaner 16. The engine unit 10, the cooling unit 14, and the air cleaner 16 are disposed in the engine room 8.

The engine unit 10 has an engine 15 and an exhaust gas treatment unit 17. The engine 15 is for example a diesel engine. As shown in FIG. 2, the engine 15 has a crankshaft 150. The crankshaft 150 extends in the forward-backward direction of the vehicle. The engine 15 is what is known as a vertical arrangement engine. That is to say, the longitudinal direction of the engine is arranged following the forward-backward direction of the vehicle, and the lateral direction of the engine is arranged along the widthwise direction of the vehicle.

A flywheel housing 18 is arranged to the rear of the engine 15. A hydraulic pump (not shown in the drawing) is positioned rearward of the flywheel housing 18. The hydraulic pump is linked to the output shaft of the engine 15 via the flywheel housing 18. The hydraulic pump ejects hydraulic fluid in order to drive the hydraulic cylinder 6.

The cooling unit 14 is arranged forward of the engine 15. The cooling unit 14 includes a radiator 21, and a cooling device 22. The radiator 21 cools the liquid coolant of the engine 15. In this embodiment, the cooling device 22 is an oil cooler. The cooling device 22 cools the hydraulic fluid. The radiator 21 is arranged forward of the engine 15. As shown in FIG. 3, the top portion of the radiator 21 is positioned above an upper face 151 of the engine 15. The cooling device 22 is positioned rearward of the radiator 21. The top portion of the cooling device 22 is positioned below the top portion of the radiator 21.

The air cleaner 16 is arranged between the radiator 21 and the exhaust gas treatment unit 17 in the forward-backward direction of the vehicle. Part of the air cleaner 16 is positioned forward of the forward end portion 152 of the engine 15. Specifically, the forward end portion of the air cleaner 16 is positioned forward of the engine 15. The rear end portion of the air cleaner 16 is positioned directly above the engine 15. Part of the air cleaner 16 is positioned directly above the cooling device 22. Specifically, the forward end portion of the air cleaner 16 is positioned directly above the cooling device 22.

The air cleaner 16 has a cylindrical form. As shown in FIG. 2, the air cleaner 16 is arranged such that the longitudinal direction thereof intersects with the forward-backward direction of the vehicle. That is to say, the center axial line Ax1 of the air cleaner 16 is at an inclination relative to the forward-backward direction of the vehicle. The angle of inclination of the center axial line Ax1 of the air cleaner 16 relative to the widthwise direction of the vehicle should be for example, less than 45°.

The air cleaner 16 has a first side portion 161 and a second side portion 162. In this embodiment, the first side portion 161 is the left side portion of the air cleaner 16. The second side portion 162 is the right side portion of the air cleaner 16. The center axial line Ax1 of the air cleaner 16 is inclined forward in a direction from the first side portion 161 toward the second side portion 162.

The air cleaner 16 is secured to the engine room 8. That is to say, the air cleaner 16 is supported by the engine room 8. Specifically, the air cleaner 16 is secured to the engine room 8 in a condition of being suspended from the upper face 13 of the engine room 8 by a bracket 23.

The air cleaner 16 has an air intake opening 163 and an air discharge opening 164. The air intake opening 163 is provided in the top portion of the air cleaner 16. The air intake opening 163 is connected to the head portion 8b. The air discharge opening 164 is provided in the second side portion 162 of the air cleaner 16.

Figure 4:
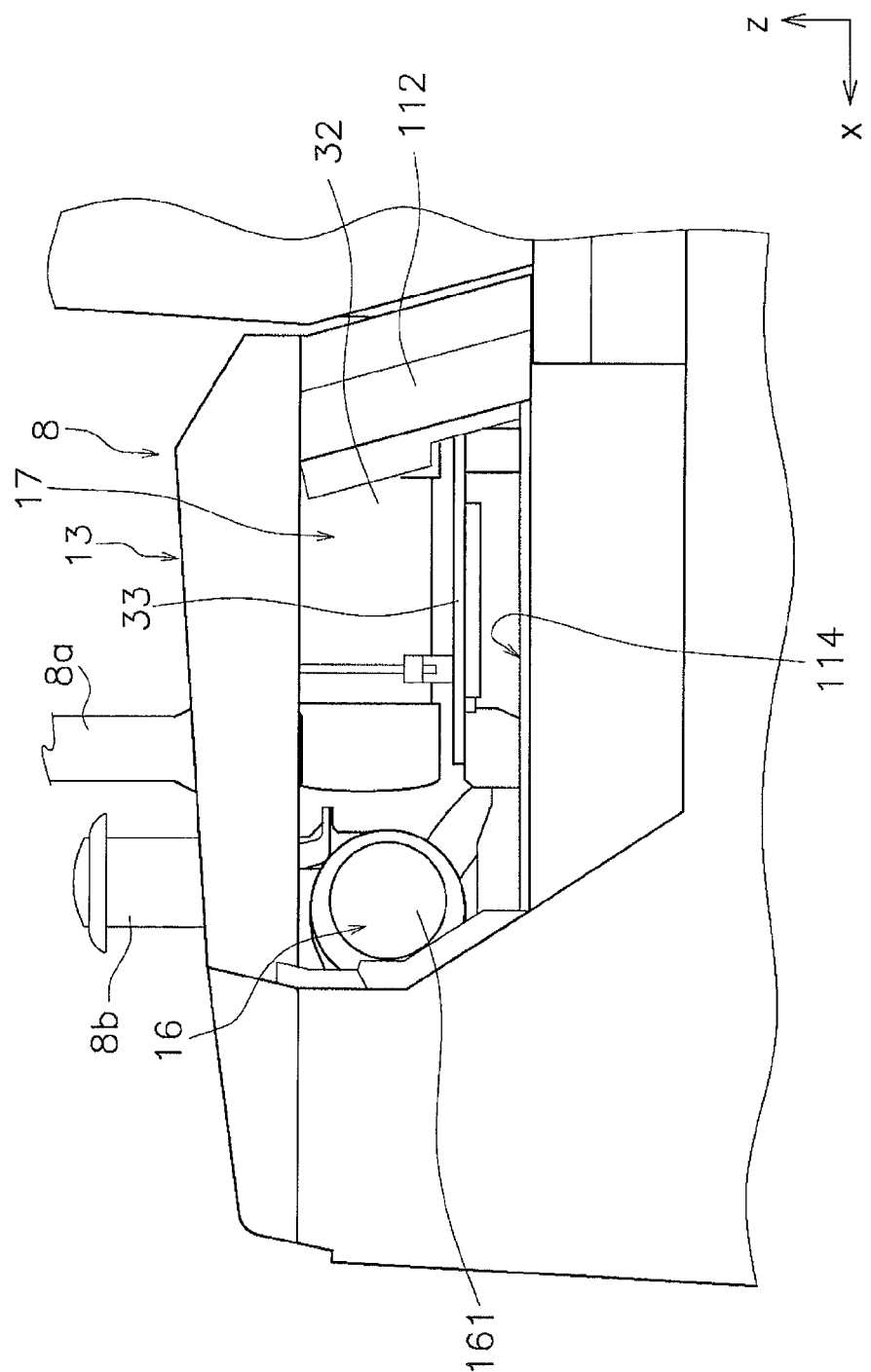
FIG. 4 is a left side view showing the engine room in the condition in which the side panel is detached.

As shown in FIG. 1 the engine room 8 has a side panel 113. FIG. 4 is a left side view showing the engine room 8 in the condition in which the side panel 113 has been detached. As shown in FIG. 4 the engine room 8 has an opening 114. The side panel 113 and the opening 114 are provided in the planar section 111 described above. The opening 114 is positioned to the lateral side of the air cleaner 16. The side panel 113 is disposed so as to be able to open and close the opening 114. As shown in FIG. 2 the above described first side portion 161 is, in the air cleaner 16, the lateral side face closest to the side panel 113. Further, the second side portion 162 is, in the air cleaner 16, the lateral side face furthest from the side panel 113. Viewed from the side of the vehicle, the first side portion 161 is disposed so as to overlap with the side panel 113. Accordingly, as shown in FIG. 4, viewed from the side of the vehicle, with the side panel 113 in the opened condition, the first side portion 161 is visible through the opening 114. Further, as shown in FIG. 2, the air cleaner 16 is arranged such that the extension line of the center axial line Ax1 passes through the opening 114.

Figure 5:
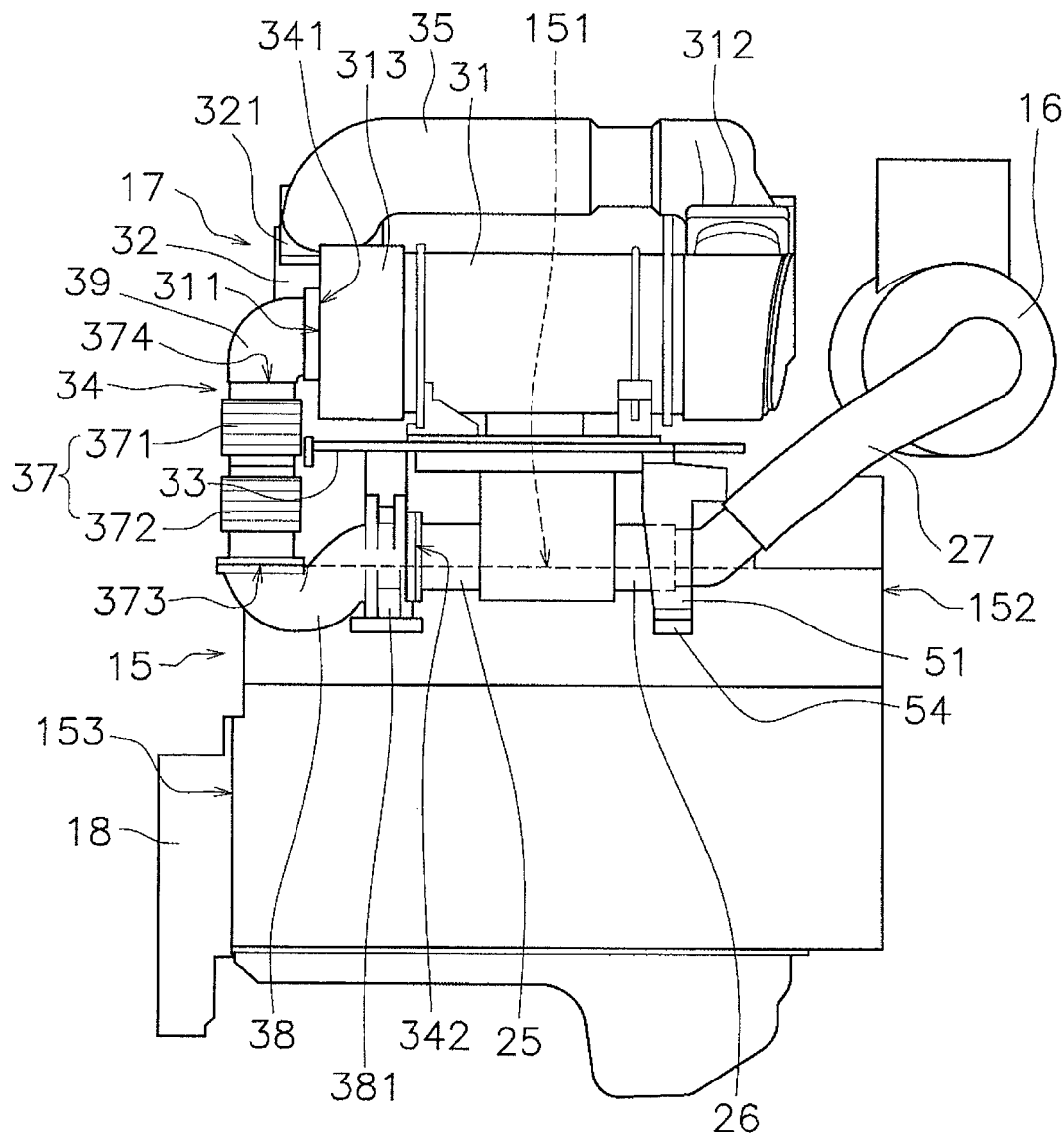
FIG. 5 is a right side view showing the engine and the devices peripheral to the engine.
Figure 6:
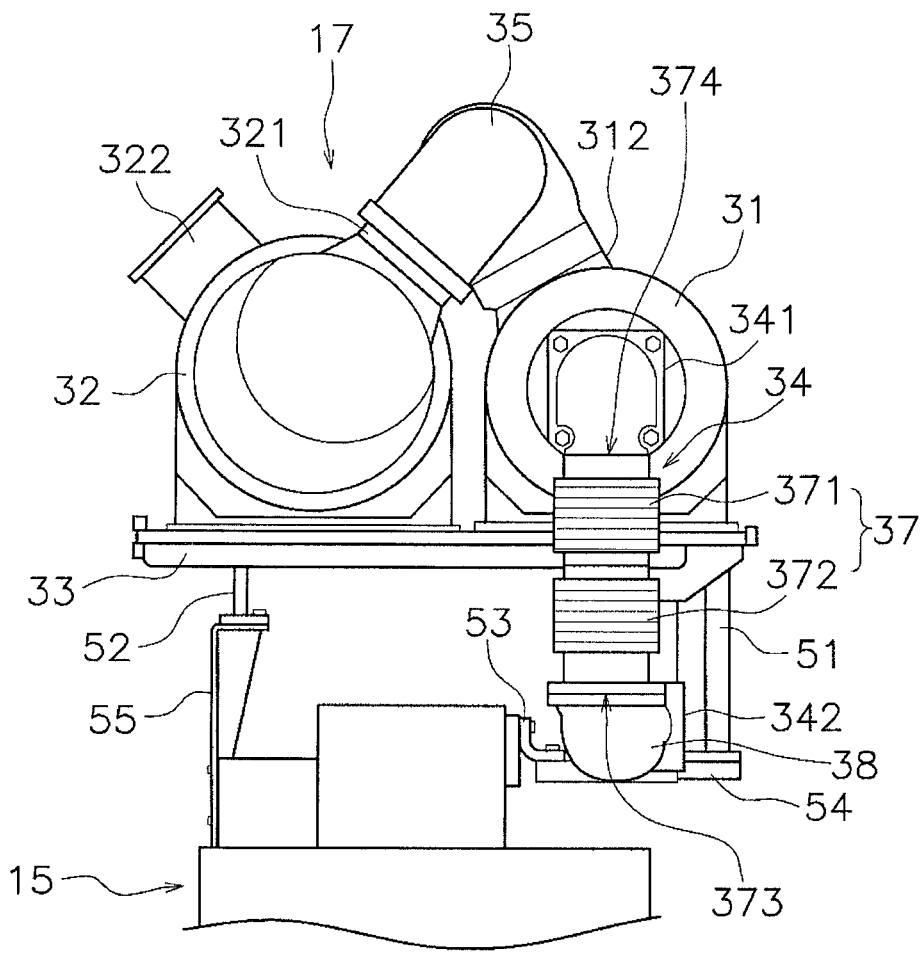
FIG. 6 is a rear view showing the engine and the devices peripheral to the engine.

FIG. 5 is a right side view showing the engine 15 and the devices peripheral to the engine 15. FIG. 6 is a rear view showing the engine 15 and the devices peripheral to the engine 15. As shown in FIG. 5, the engine 15 has an exhaust gas port 25 and an air suction opening 26. The exhaust gas port 25 and the air suction opening 26 are provided on the side section of the engine 15. In this embodiment, the exhaust gas port 25 and the air suction opening 26 are provided on the right side section of the engine 15. The exhaust gas port 25 is positioned rearward of the air suction opening 26. The air suction opening 26 is connected to the air discharge opening 164 of the air cleaner 16 via a duct 27.

The exhaust gas treatment unit 17 is a device for cleaning exhaust gas from the engine 15. As shown in FIG. 2 and FIG. 6, the exhaust gas treatment unit 17 is positioned above the engine 15. The exhaust gas treatment unit 17 has a first exhaust gas treatment device 31 and a second exhaust gas treatment device 32.

The first exhaust gas treatment device 31 is a device for treating exhaust gas from the engine 15. In this embodiment, the first exhaust gas treatment device 31 is a diesel particulate filter device that collects particulate matter within exhaust gas by a filter. The first exhaust gas treatment device 31 incinerates the collected particulate matter in a heater attached to the filter. The first exhaust gas treatment device 31 is of substantially cylindrical external form. The first exhaust gas treatment device 31 is arranged such that the longitudinal direction thereof follows the forward-backward direction of the vehicle. That is to say, the center axial line Ax2 of the first exhaust gas treatment device 31 is positioned following the forward-backward direction of the vehicle.

The second exhaust gas treatment device 32 is a device for treating exhaust gas from the engine 15. In this embodiment, the second exhaust gas treatment device 32 is a selective catalytic reduction device that uses ammonia obtained by hydrolysis of aqueous urea for reducing nitrogen oxide NOx. The second exhaust gas treatment device 32 is of substantially cylindrical external form. The second exhaust gas treatment device 32 is arranged such that the longitudinal direction thereof follows the forward-backward direction of the vehicle. That is to say, the center axial line Ax3 of the second exhaust gas treatment device 32 is positioned following the forward-backward direction of the vehicle. The second exhaust gas treatment device 32 is provided to the side of the first exhaust gas treatment device 31. In this embodiment, the second exhaust gas treatment device 32 is provided on the left side of the first exhaust gas treatment device 31.

As shown in FIG. 5, the front end portion of the first exhaust gas treatment device 31 is positioned alongside the front end portion 152 of the engine 15. The rear end portion of the first exhaust gas treatment device 31 is positioned forward of the rear end portion 153 of the engine 15. The rear end portion of the first exhaust gas treatment device 31 is positioned between the first inclined face 112 and the second inclined section 122.

As shown in FIG. 2, the front end portion of the second exhaust gas treatment device 32 is positioned rearward of the front end portion 152 of the engine 15. The front end portion of the second exhaust gas treatment device 32 is positioned rearward of the front end portion of the first exhaust gas treatment device 31. The rear end portion of the second exhaust gas treatment device 32 is positioned forward of the rear end portion 153 of the engine 15. The rear end portion of the second exhaust gas treatment device 32 is positioned rearward of the rear end portion of the first exhaust gas treatment device 31. The rear end portion of the second exhaust gas treatment device 32 is positioned between the first inclined face 112 and the second inclined section 122.

As shown in FIG. 3, FIG. 5 and FIG. 6, the exhaust gas treatment unit 17 has a bracket 33. The first exhaust gas treatment device 31 and the second exhaust gas treatment device 32 are arranged above the bracket 33. The first exhaust gas treatment device 31 and the second exhaust gas treatment device 32 are secured to the bracket 33 by fixing means such as a U bolt or the like. In this way, the first exhaust gas treatment device 31, the second exhaust gas treatment device 32 and the bracket 33 are integrated. The bracket 33 is attached to the engine 15 via a supporting member described subsequently, thus the exhaust gas treatment unit 17 is supported by the engine 15.

The engine unit 10 provides a first connecting pipe 34. The first connecting pipe 34 links the exhaust gas port 25 of the engine 15 and the first exhaust gas treatment device 31. The first connecting pipe 34 is connected to the exhaust gas port 25 of the engine 15. As shown in FIG. 5, the first connecting pipe 34 has a first end portion 341 and a second end portion 342. The first end portion 341 is connected to the first exhaust gas treatment device 31. The second end portion 342 is the end portion on the opposite end to the first end portion 341. The second end portion 342 is connected to the exhaust gas port 25. As shown in FIG. 6, the first end portion 341 and the second end portion 342 are positioned in the same perpendicular plane extending in the forward-backward direction of the vehicle. The first connecting pipe 34 is positioned in that same perpendicular plane.

The rear end portion of the first connecting pipe 34 is positioned rearward of the rear end portion of the second exhaust gas treatment device 32. As shown in FIG. 3, the cab 7 is disposed rearward of the first connecting pipe 34. Viewed from the side of the vehicle, a wall part 19 is arranged between the first connecting pipe 34 and the cab 7. That is to say, the wall part 19 is arranged between the cab 7 and the engine 15. The wall part 19 is the rear face of the engine room 8. The first connecting pipe 34 is arranged close to the wall part 19 of the engine room 8. Specifically, the distance between the wall part 19 of the engine room 8 and the first connecting pipe 34 is smaller than the diameter of the first connecting pipe 34.

Figure 7:
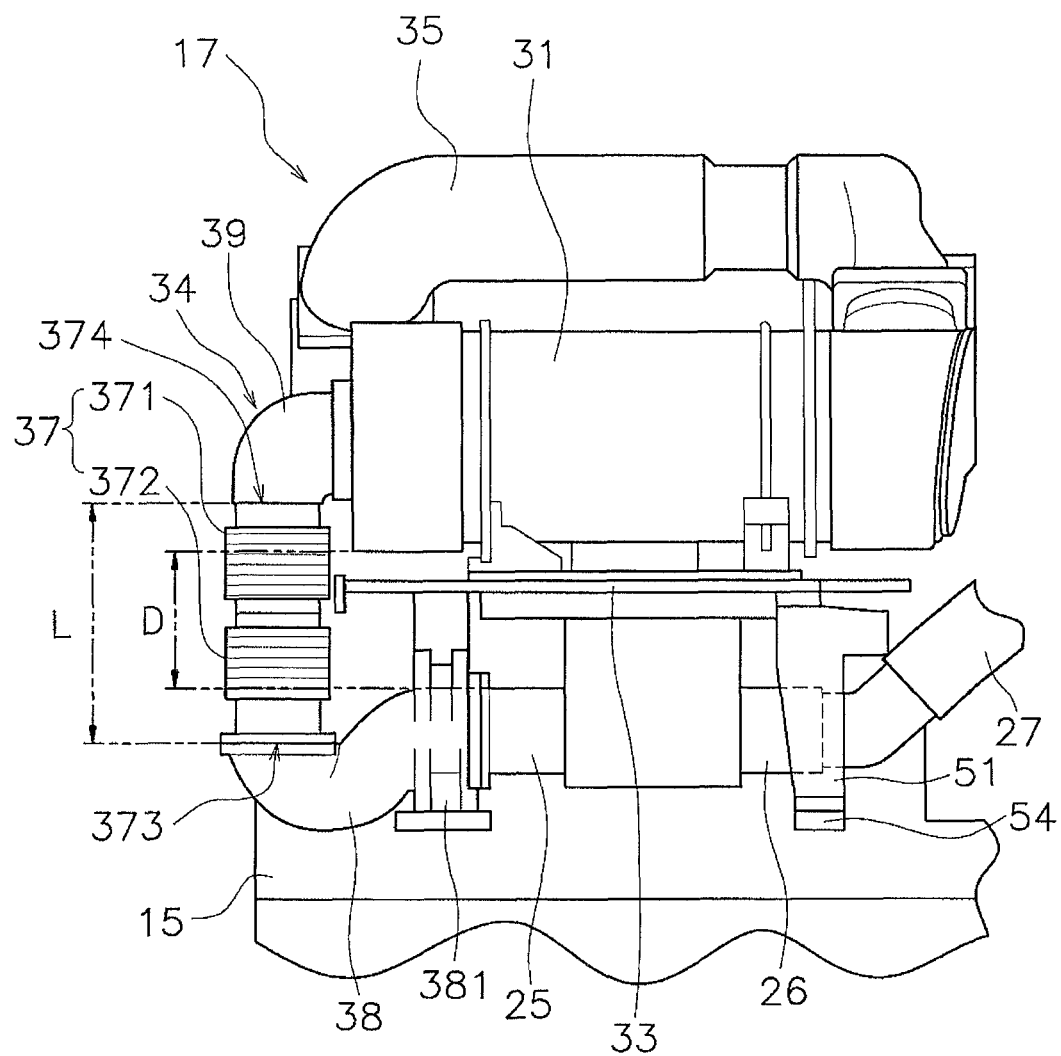
FIG. 7 is an expanded view of a part of FIG. 5.

As shown in FIG. 5, the first connecting pipe 34 has an expandable-contractible bellows portion 37. The bellows portion 37 has a linear form following the upward-downward direction. Note that in this embodiment, the bellows portion 37 includes not only the bellows shaped part, but also the connecting end part that forms an integrated body with the bellows shaped part. The lower end portion 373 of the bellows portion 37 is positioned lower than the upper end portion of the exhaust gas port 25. The upper end portion 374 of the bellows portion 37 is positioned above the upper face of the bracket 33. The upper end portion 374 of the bellows portion 37 is positioned above the lower end portion of the first exhaust gas treatment device 31. As shown in FIG. 7, the length L of the bellows portion 37 is longer than the distance D in the upward-downward direction, between the upper end portion of the exhaust gas port 25 and the lower end portion of the first exhaust gas treatment device 31. As shown in FIG. 3, the bellows portion 37 is arranged extending in the upward-downward direction following the wall part 19. Thus, the configuration being such that the distance D between the lower end portion of the first exhaust gas treatment device 31 and the upper end portion of the exhaust gas port 25 is shorter than the length L of the bellows portion 37, the height of the first and second exhaust gas treatment devices 31 and 32 can be reduced, thereby realizing improved visibility in the forward direction of the vehicle.

As shown in FIG. 5, the bellows portion 37 has a first bellows tube 371 and a second bellows tube 372. The second bellows tube 372 is a separate body from the first bellows tube 371. The second bellows tube 372 is arranged below the first bellows tube 371. The second bellows tube 372 is connected to the first bellows tube 371.

The first connecting pipe 34 has a first connecting pipe portion 38. The first connecting pipe portion 38 connects the exhaust gas port 25 and the lower end portion 373 of the bellows portion 37. The first connecting pipe portion 38 has a form curving from the exhaust gas port 25 to a position lower than the exhaust gas port 25. Further, the first connecting pipe portion 38 has a form curving from a position lower than the exhaust gas port 25 toward the upward direction.

The first connecting pipe 34 has a second connecting pipe portion 39. The first exhaust gas treatment device 31 has a cylindrical portion 313 and an end face 311. The end face 311 closes the end of the cylindrical portion 313 in the axial direction of the first exhaust gas treatment device 31. The end face 311 is the rear face of the first exhaust gas treatment device 31. The second connecting pipe portion 39 connects the end face 311 of the first exhaust gas treatment device 31 and the upper end portion 374 of the bellows portion 37. The second connecting pipe portion 39 attaches directly to the end face 311 of the first exhaust gas treatment device 31. The second connecting pipe portion 39 has a form curving downward from the end face 311.

The engine unit 10 has a second connecting pipe 35. The second connecting pipe 35 connects the first exhaust gas treatment device 31 and the second exhaust gas treatment device 32. As shown in FIG. 2 and FIG. 6, the second connecting pipe 35 is positioned above the space between the first exhaust gas treatment device 31 and the second exhaust gas treatment device 32.

Specifically, the first exhaust gas treatment device 31 has a first connection opening 312. The first connection opening 312 projects upward moreover toward the second exhaust gas treatment device 32 side. The first connection opening 312 is provided in the front portion of the peripheral surface of the first exhaust gas treatment device 31. The second connecting pipe 35 is connected to the first connection opening 312.

The second exhaust gas treatment device 32 has a second connection opening 321. The second connection opening 321 is provided in the rear portion of the peripheral surface of the second exhaust gas treatment device 32. The second connection opening 321 is positioned rearward of the first connection opening 312. The second connection opening 321 projects upward moreover toward the first exhaust gas treatment device 31 side. The second connecting pipe 35 is connected to the second connection opening 321.

The second exhaust gas treatment device 32 has a third connection opening 322. The third connection opening 322 is provided in the front portion of the peripheral surface of the second exhaust gas treatment device 32. The third connection opening 322 is positioned forward of the second connection opening 321. The third connection opening 322 is positioned to the side of the first connection opening 312. The third connection opening 322 projects upward moreover toward the direction outward from the first exhaust gas treatment device 31.

As shown in FIG. 3, the engine unit 10 has a third connecting pipe 36. The third connecting pipe 36 is connected to the third connection opening 322. The upper part of the third connecting pipe 36 projects upward from the upper face 13 of the engine room 8. The exhaust gas outlet 8a is connected to the third connecting pipe 36.

The engine 15, the first connecting pipe 34, the first exhaust gas treatment device 31, the second connecting pipe 35, the second exhaust gas treatment device 32, and the third connecting pipe 36 are connected in that order in series. Accordingly, exhaust gas from the engine 15 passes through the first connecting pipe 34 and is delivered to the first exhaust gas treatment device 31. At the first exhaust gas treatment device 31, mainly particulate matter, is decreased in the exhaust gas. Next, the exhaust gas passes through the second connecting pipe 35 and is delivered to the second exhaust gas treatment device 32. At the second exhaust gas treatment device 32 mainly NOx, is decreased in the exhaust gas. Thereafter, the purified exhaust gas passes through the third connecting pipe 36 and the exhaust gas outlet 8a described above and is expelled to the outside.

Figure 8:
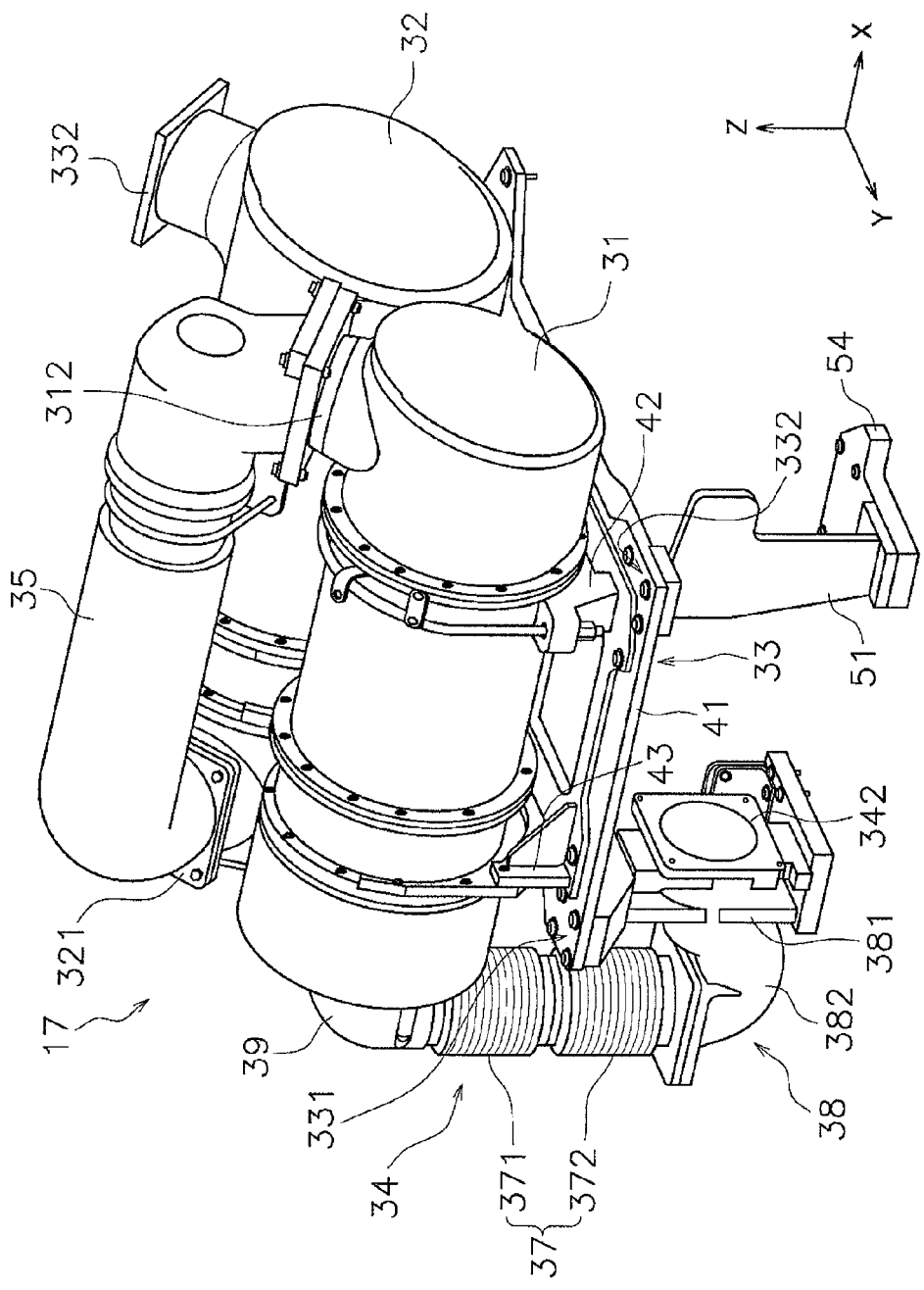
FIG. 8 is a perspective view of the exhaust gas treatment unit of the working vehicle.
Figure 9:
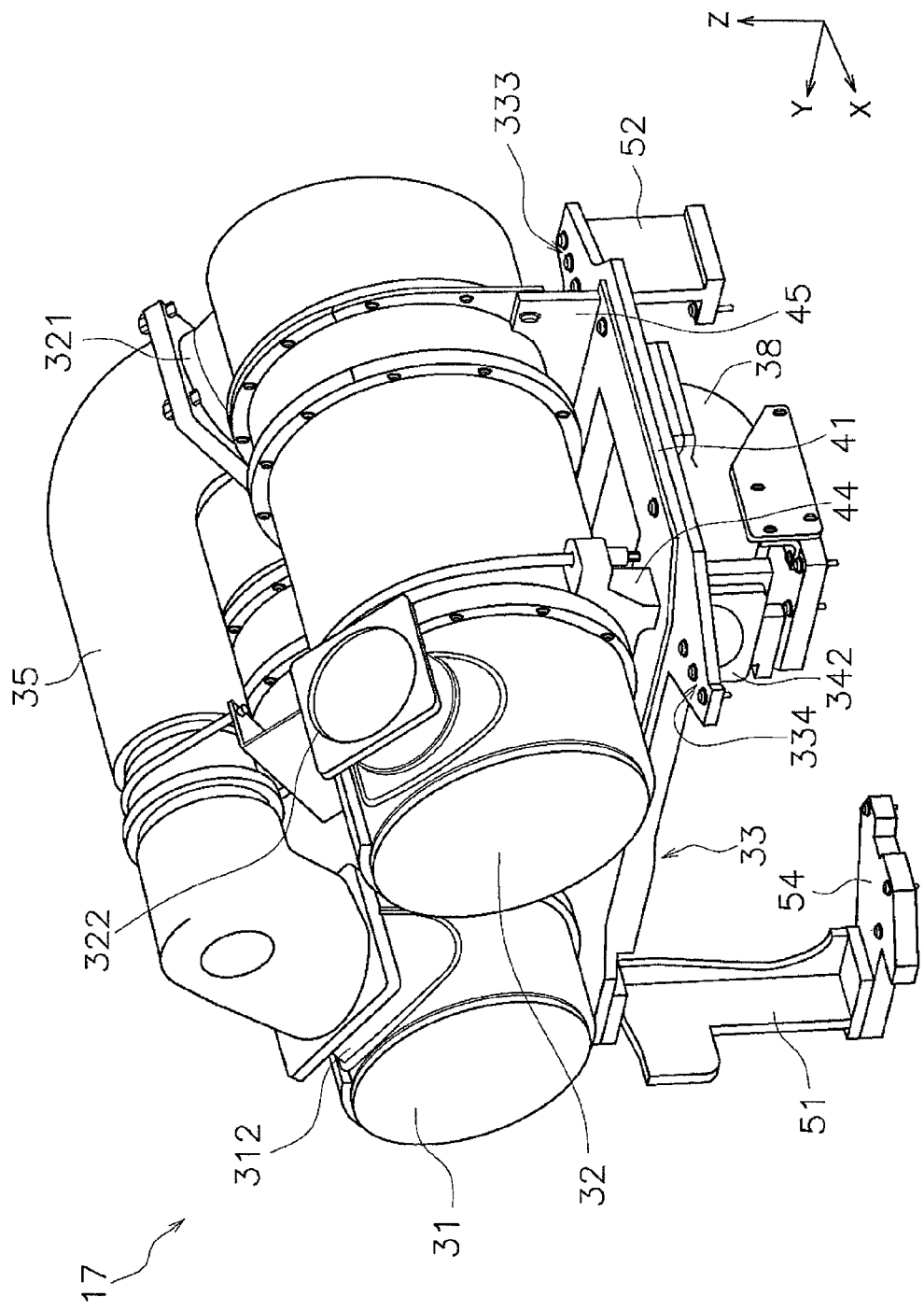
FIG. 9 is a perspective view of the exhaust gas treatment unit of the working vehicle.

FIG. 8 and FIG. 9 provide perspective views of the exhaust gas treatment unit 17. Specifically, FIG. 8 shows the exhaust gas treatment unit 17 viewed from the right oblique front. FIG. 9 shows the exhaust gas treatment unit 17 viewed from the left oblique front.

As described above, the exhaust gas treatment unit 17 has the bracket 33. As shown in FIG. 8 the bracket 33 has a plate part 41, a first mounting part 42 and a second mounting part 43. The plate part 41 is of substantially rectangular form. The first mounting part 42 and the second mounting part 43 are arranged on the plate part 41. The upper face of the first mounting part 42 has a curved recess shape the curvature of which follows the bottom of the first exhaust gas treatment device 31. The upper face of the second mounting part 43 has a curved recess shape the curvature of which follows the bottom of the first exhaust gas treatment device 31. The first mounting part 42 and the second mounting part 43 are arranged side-by-side following the lengthwise direction of the first exhaust gas treatment device 31. The first exhaust gas treatment device 31 is disposed on the first mounting part 42 and the second mounting part 43 and is attached to the first mounting part 42 and the second mounting part 43.

As shown in FIG. 9, the bracket 33 has a third mounting part 44 and a fourth mounting part 45. The third mounting part 44 and the fourth mounting part 45 are arranged on the plate part 41. The upper face of the third mounting part 44 has a curved recess shape the curvature of which follows the bottom of the second exhaust gas treatment device 32. The upper face of the fourth mounting part 45 has a curved recess shape the curvature of which follows the bottom of the second exhaust gas treatment device 32. The third mounting part 44 and the fourth mounting part 45 are arranged side-by-side following the lengthwise direction of the second exhaust gas treatment device 32. The second exhaust gas treatment device 32 is disposed on the third mounting part 44 and the fourth mounting part 45 and is attached to the third mounting part 44 and the fourth mounting part 45.

As shown in FIG. 8 and FIG. 9 the exhaust gas treatment unit 17 has a plurality of supporting members 38, 51 and 52. The plurality of supporting members 38, 51 and 52 support the bracket 33. Among these supporting members 38, 51 and 52, the supporting member 38 includes the first connecting pipe portion 38. That is to say, the first connecting pipe portion 38 also functions as the first supporting member for supporting the bracket 33 of the exhaust gas treatment unit 17. As shown in FIG. 8, the first connecting pipe portion 38 is arranged below the first exhaust gas treatment device 31. The bracket 33 has a first fixed part 331. The first connecting pipe portion 38 is secured to the first fixed part 331.

Figure 10:
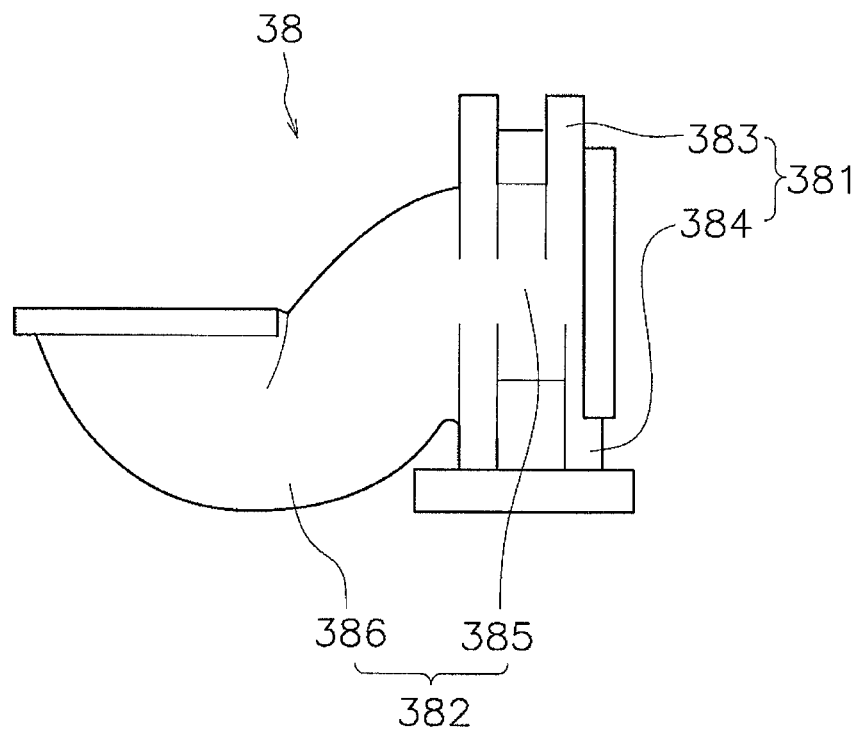
FIG. 10 is a right side view of the first connecting pipe portion.

FIG. 10 is a right side view of the first connecting pipe portion 38. As shown in FIG. 10, the first connecting pipe portion 38 is an integrally formed single part. However, it is also suitable for the first connecting pipe portion 38 to be configured as a combination of a plurality of parts. The first connecting pipe portion 38 includes a supporting part 381 and a tubular portion 382. The supporting part 381 is positioned below the bracket 33. The supporting part 381 includes an upper support 383 and a lower support 384. The upper support 383 extends upward from the tubular portion 382. The lower support 384 extends downward from the tubular portion 382. As shown in FIG. 8 the supporting part 381 supports the bracket 33. The supporting part 381 supports the corner of the bracket 33. In this embodiment, the first fixed part 331 is disposed at the right rear corner of the bracket 33. Accordingly, the supporting part 381 supports the right rear corner of the bracket 33.

The tubular portion 382 is integrated with the supporting part 381. The tubular portion 382 is disposed so as to pass through the supporting part 381. The tubular portion 382 is arranged below the bracket 33. The tubular portion 382 is arranged extending in the forward-backward direction. The bellows portion 37 described above, is, along the path of the exhaust gas, disposed between the tubular portion 382 and the first exhaust gas treatment device 31.

The tubular portion 382 has a first tubular portion 385 and a second tubular portion 386. The first tubular portion 385 is positioned between the upper support 383 and the lower support 384. The first tubular portion 385 connects to the exhaust gas port 25 described above. The second tubular portion 386 is linked to the first tubular portion 385. The second tubular portion 386 has a form curving from the first tubular portion 385 toward a position lower than the exhaust gas port 25. Further, the second tubular portion 386 has a form curving from the position lower than the exhaust gas port 25 toward the upward direction. The second tubular portion 386 is connected to the lower end portion 373 of the bellows portion 37 described above.

As shown in FIG. 8, the plurality of supporting members has a second supporting member 51. The second supporting member 51 is arranged forward of the first connecting pipe portion 38. The second supporting member 51 is arranged below the first exhaust gas treatment device 31. The bracket 33 has a second fixed part 332. The second supporting member 51 is secured to the second fixed part 332. The second fixed part 332 is positioned forward of the first fixed part 331. The second supporting member 51 supports a corner of the bracket 33. In this embodiment, the second fixed part 332 is disposed at the right front corner of the bracket 33. Accordingly, the second supporting member 51 supports the right front corner of the bracket 33. As shown in FIG. 6, the second supporting member 51 is positioned further to the outer lateral side than the first connecting pipe portion 38. As shown in FIG. 5, the air suction opening 26 is arranged to the inner lateral side from the 51. In this embodiment, the second supporting member 51 is positioned further to the right than the first connecting pipe portion 38. The air suction opening 26 is arranged to the left of the second supporting member 51.

As shown in FIG. 6 and FIG. 8, the first connecting pipe portion 38 is secured to the engine 15 via a first fixed bracket 53. The second supporting member 51 is secured to the engine 15 via a second fixed bracket 54.

As shown in FIG. 9, among the plurality of supporting members 38, 51 and 52, the third supporting member 52 is arranged below the second exhaust gas treatment device 32. The bracket 33 has a third fixed part 333. The third supporting member 52 is secured to the third fixed part 333. The third supporting member 52 supports a corner of the bracket 33. In this embodiment, the third fixed part 333 is disposed at the left rear corner of the bracket 33. Accordingly, the third supporting member 52 supports the left rear corner of the bracket 33.

The bracket 33 has a fourth fixed part 334. The fourth fixed part 334 is positioned forward of the third fixed part 333. In this embodiment, the fourth fixed part 334 is disposed at the left front corner of the bracket 33. As shown in FIG. 6, the third supporting member 52 is secured to the engine 15 via a third fixed bracket 55. As shown in FIG. 3, the fourth fixed part 334 is secured to the engine 15 via the fourth fixed bracket 56.

The working vehicle 1 and engine unit 10 according to this embodiment have the following characteristics.

The first connecting pipe 34 has an expandable/contractible bellows portion 37. Accordingly, vibrations conveyed to the first connecting pipe 34 are absorbed by the bellows portion 37. For this reason the load on the first connecting pipe 34 due to vibrations is reduced. Further, the bellows portion 37 has a linear form following the upward-downward direction. Accordingly, the bellows portion 37 can be compactly arranged. Further, the lower end portion 373 of the bellows portion 37 is positioned lower than the upper end portion of the exhaust gas port 25. For this reason, the length of the bellows portion 37 can be increased. Thus, vibration absorption capability in the bellows portion 37 can be increased.

The length L of the bellows portion 37 is longer than the distance D that is the distance between the lower end portion of the first exhaust gas treatment device 31 and the upper end portion of the exhaust gas port 25 in the upward-downward direction. In this case, the length L of the bellows portion 37 can be increased and the vibration absorption capability in the bellows portion 37 can be improved.

The first connecting pipe portion 38 is of a form bending from the exhaust gas port 25 toward a downward position lower than the exhaust gas port 25. In this arrangement, the length of the bellows portion 37 can be increased, enabling the vibration absorption capability of the bellows portion 37 to be improved.

The first connecting pipe 34 is connected to the end face 311 of the first exhaust gas treatment device 31. Accordingly, the length of the first connecting pipe 34 can be increased. For this reason, the length of the bellows portion 37 can be substantial, enabling the vibration absorption capability of the bellows portion 37 to be improved.

The second connecting pipe portion 39 of the first connecting pipe 34 is directly mounted on the end face 311 of the first exhaust gas treatment device 31. For this reason, in comparison to the case in which the second connecting pipe portion 39 is connected to the connecting port protruding outward from the end face 311 of the first exhaust gas treatment device 31, the connecting portion of the second connecting pipe portion 39 and the first exhaust gas treatment device 31 can be smaller.

The bellows portion 37 has the first bellows tube 371 and the second bellows tube 372. The second bellows tube 372 is a separate body to the first bellows tube 371, and is connected to the first bellows tube 371. For this reason, the occurrence of resonance in the bellows portion 37 can be suppressed.

The first exhaust gas treatment device 31 is arranged such that that the center axial line Ax2 thereof follows the axial direction of the crankshaft 150. Further, the second exhaust gas treatment device 32 is arranged such that the center axial line Ax3 thereof follows the axial direction of the crankshaft 150. For this reason, the first exhaust gas treatment device 31 and the second exhaust gas treatment device 32 can be efficiently arranged in space above the engine 15.

The bellows portion 37 is arranged so as to extent in the upward-downward direction following the wall part 19 of the engine room 8. For this reason, the first exhaust gas treatment device 31 and the bellows portion 37 can be arranged proximate to the wall part 19. That is to say, the first exhaust gas treatment device 31 and the bellows portion 37 can be arranged as far as possible to the rear. In this way, in the engine room 8, substantial space can be maintained for arranging equipment such as the air cleaner 16 and the like, forward of the first exhaust gas treatment device 31.

Although the invention has been described above by reference to an embodiment thereof, the invention is not limited to the embodiment described above. It is therefore understood that numerous modifications and variations can be devised without departing from the scope of the invention.

In the above-described embodiment, a bulldozer was provided as an example of a working vehicle. The present invention is not restricted to a bulldozer, however, and may be applied to another working vehicle such as a wheel loader or a hydraulic shovel or the like.

The configuration of the exhaust gas treatment unit 17 is not restricted to that as described above. For example, it is suitable for the first exhaust gas treatment device 31 to be a treatment device other than a diesel particulate filter device. It is suitable for the second exhaust gas treatment device 32 to be a treatment device other than a selective catalytic reduction device. It is suitable for the first exhaust gas treatment device 31 and the second exhaust gas treatment device 32 to be arranged in positions other than the above described positions. The first exhaust gas treatment device 31 is not limited to being of cylindrical form or the like, and it is suitable for the first exhaust gas treatment device 31 to be of another form such as elliptically cylindrical or cuboid. The second exhaust gas treatment device 32 is not limited to being of cylindrical form or the like, and it is suitable for the second exhaust gas treatment device 32 to be of another form such as elliptically cylindrical or cuboid. Again, it is suitable for the first through third connecting pipes 34, 35, and 36 to be arranged in positions different to those as described above.

It is suitable for the layout of the engine room 8 to be opposite in the lateral direction, to the layout described above. For example, it is suitable for the first exhaust gas treatment device 31 to be arranged to the left side and for the second exhaust gas treatment device 32 to be arranged to the right side. It is suitable for the first side portion 161 of the air cleaner 16 to be arranged to the right side and for the second side portion 162 to be arranged to the left side.

It is suitable for the bellows portion 37 to be arranged below the entirety of the exhaust gas port 25. That is to say, it is suitable for the bellows portion 37 to be positioned below the lower end portion of the exhaust gas port 25. It is suitable for the length L of the bellows portion 37 to be shorter than the distance D in the upward-downward direction, between the upper end portion of the exhaust gas port 25 and the lower end portion of the first exhaust gas treatment device 31. However, in order to obtain superior vibration absorption capability from the bellows portion 37, it is preferable that the bellows portion 37 be as long as possible.

It is suitable for the first connecting pipe 34 to be connected to a part other than the end face 311 of the first exhaust gas treatment device 31. For example, it is suitable for the first connecting pipe 34 to be connected to the bottom of the first exhaust gas treatment device 31. Again, it is suitable for the first connecting pipe 34 to be connected to the end face 311 of the first exhaust gas treatment device 31 via a connection port.

It is suitable for the bellows portion 37 to be a single member. Again, it is suitable for the bellows portion 37 to be comprised of three or more separate bellows portions.

It is suitable for the bellows portion 37 to be arranged in a position removed from the wall part 19 of the engine room 8. For example, it is suitable for the bellows portion 37 to be arranged to the side of the engine 15. Again, it is suitable for the bellows portion 37 to be arranged forward of the engine 15.

INDUSTRIAL APPLICABILITY

According to the present invention, an engine unit is provided that enables the load on a connecting pipe due to vibration to be reduced.

The invention claimed is:
1. An engine unit comprising:
an engine having an exhaust gas port;
an exhaust gas treatment device arranged above the engine; and
a connecting pipe connecting the exhaust gas port and the exhaust gas treatment device, the connecting pipe having an expandable-contractible bellows portion,
the bellows portion having a linear form following an upward-downward direction, with a lower end part of the bellows portion being positioned lower than at least a part of the exhaust gas port, the connecting pipe having a first connecting pipe portion connecting the exhaust gas port and the lower end portion of the bellows portion, and the first connecting pipe portion having a form bending from the exhaust gas port toward a downward position lower than the exhaust gas port.

2. The engine unit according to claim 1, wherein
an upper end of the bellows portion is positioned higher than a lower end portion of the exhaust gas treatment device.

3. The engine unit according to claim 1, wherein
a length of the bellows portion is longer than a distance in the upward-downward direction between a lower end portion of the exhaust gas treatment device and an upper end portion of the exhaust gas port.

4. The engine unit according to claim 1, further comprising
a bracket with the exhaust gas treatment device arranged thereon, the first connecting pipe portion having a supporting part supporting the bracket.

5. The engine unit according to claim 1, wherein
the exhaust gas treatment device has a cylindrical portion and an end face closing an end of the cylindrical portion in an axial direction of the exhaust gas treatment device, and the connecting pipe connects to the end face of the exhaust gas treatment device.

6. The engine unit according to claim 5, wherein
the connecting pipe has a second connecting pipe portion connecting the end face of the exhaust gas treatment device and an upper end portion of the bellows portion, and the second connecting pipe portion is directly mounted on the end face of the exhaust gas treatment device.

7. The engine unit according to claim 1, wherein
the bellows portion has a first bellows tube and a second bellows tube, the second bellows tube being a separate body from the first bellows tube, and the second bellows tube being connected to the first bellows tube.

8. The engine unit according to claim 1, wherein
the engine has a crankshaft, and
the exhaust gas treatment device is arranged such that an axial line of the exhaust gas treatment device follows an axial direction of the crankshaft.

9. A working vehicle including the engine unit according to claim 1.

10. The working vehicle according to claim 9, further comprising:
an engine room housing the engine unit; and
a cab arranged adjacent to the engine room,
the engine room having a wall part arranged between the cab and the engine, and
the bellows portion being arranged so as to extend in the upward-downward direction following the wall part.

11. The working vehicle according to claim 10, wherein
the exhaust gas treatment device comprises a first exhaust gas treatment device; and
the working vehicle further includes
a second exhaust gas treatment device disposed on a side of the first exhaust gas treatment device;
a rear end portion of the second exhaust gas treatment device being positioned rearward of a rear end portion of the first exhaust gas treatment device;
the wall being positioned rearward of the first exhaust gas treatment device; and
the bellows portion being arranged to extend in the upward-downward direction following the wall part in a space between the wall part and the first exhaust gas treatment device.

* * * * *